(12) United States Patent
Atkin et al.

(10) Patent No.: US 8,161,498 B2
(45) Date of Patent: Apr. 17, 2012

(54) PROVIDING GLOBALIZATION FUNCTIONALITIES FOR JAVASCRIPT APPLICATIONS

(75) Inventors: Steven Edward Atkin, Wesley Chapel, FL (US); Bei Shu, Shanghai (CN); Chun Jie Tong, Shanghai (CN); Xiao Hui Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1239 days.

(21) Appl. No.: 11/856,110

(22) Filed: Sep. 17, 2007

(65) Prior Publication Data

US 2008/0082965 A1 Apr. 3, 2008

(30) Foreign Application Priority Data

Sep. 29, 2006 (CN) .......................... 2006 1 0141424

(51) Int. Cl.
G06F 9/44 (2006.01)

(52) U.S. Cl. ........................................ 719/320; 717/118
(58) Field of Classification Search .................. 717/115, 717/116, 117, 118; 719/310, 320
See application file for complete search history.

(56) References Cited

U.S. PATENT DOCUMENTS

| 6,092,036 | A | 7/2000 | Hamann | |
|---|---|---|---|---|
| 6,983,238 | B2 | 1/2006 | Gao | |
| 7,650,390 | B2 * | 1/2010 | Arner et al. | 709/217 |
| 7,725,574 | B2 * | 5/2010 | O'Connell et al. | 709/224 |
| 2004/0205706 | A1 | 10/2004 | Portwood | |
| 2006/0129984 | A1 | 6/2006 | Chen | |
| 2006/0156278 | A1 | 7/2006 | Reager | |
| 2007/0055964 | A1 * | 3/2007 | Mirkazemi et al. | 717/140 |
| 2007/0136417 | A1 * | 6/2007 | Kreiner et al. | 709/203 |
| 2007/0282858 | A1 * | 12/2007 | Arner et al. | 707/10 |
| 2008/0091800 | A1 * | 4/2008 | Sorrentino et al. | 709/219 |

OTHER PUBLICATIONS

Steve Vinoski, "Scripting JAX-WS", IEEE Internet Computing, May*Jun. 2006, pp. 91-92, Published by the IEEE Computer Society.

* cited by examiner

*Primary Examiner* — Van Nguyen

(57) ABSTRACT

Globalization functionalities for JavaScript applications are provided by asynchronously invoking globalization Web services related to specific JavaScript applications that are developed using asynchronous JavaScript and XML (Ajax) technology. A result of the asynchronous invocation is processed to obtain the corresponding globalization functionality. A client-side component invokes the globalization Web services by creating a SOAP request including specific parameters in passing that request to a server-side component. The server side component creates a result that is passed back to the client side component.

14 Claims, 7 Drawing Sheets

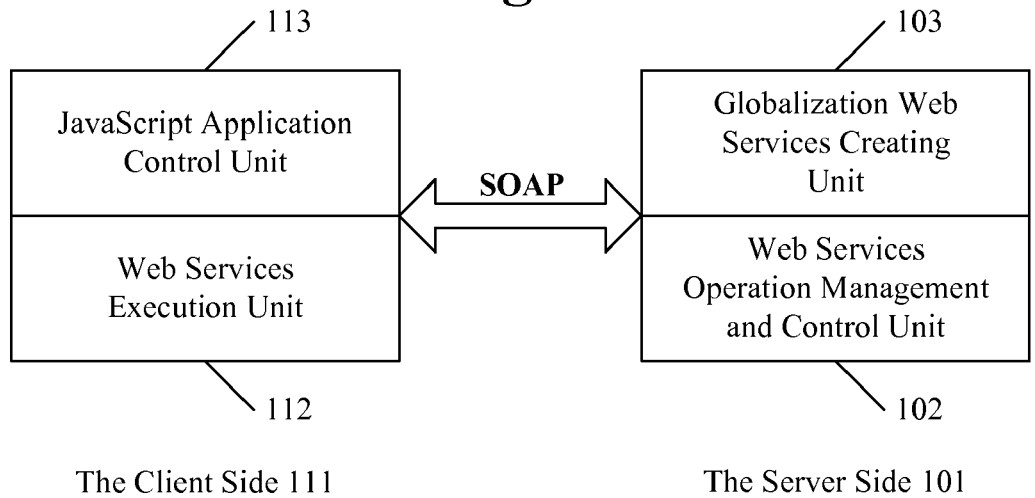
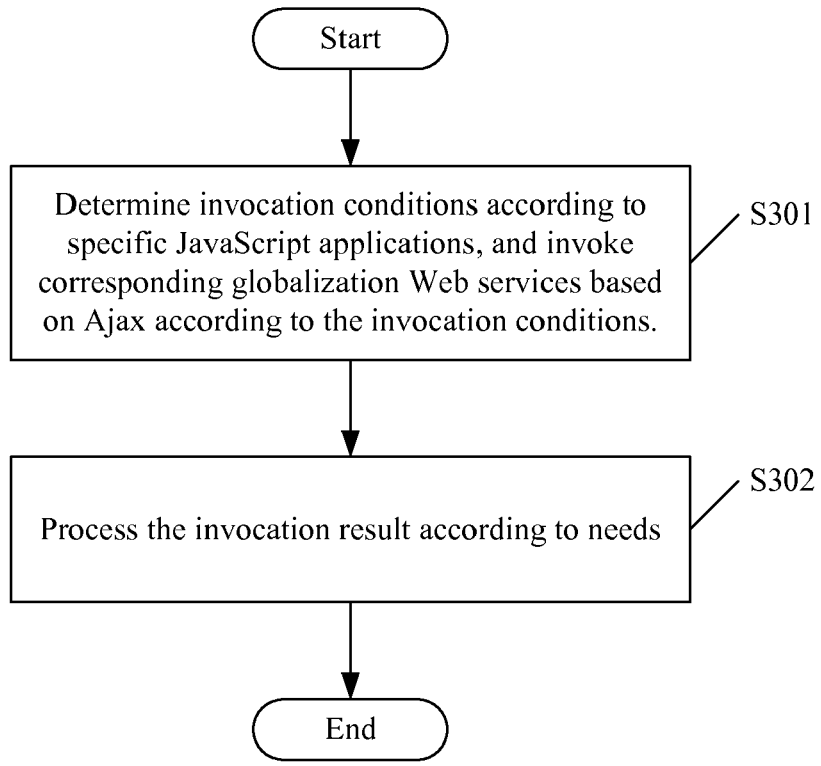

```
501    public String format (String strDate, int style,
               String srcLocale, String destLocale) {

502        com.ibm.icu.text.DateFormat dateFormat =
                   com.ibm.icu.text.DateFormat.getDateInstance (style, srcLocale);
503        Date date = dateFormat.parse (strDate);

504        dateFormat = com.ibm.icu.text.DateFormat.getDateInstance (style,destLocale);
505        return dateFormat.format (date);
       }
```

Fig. 5

```
<head><title>DateFormat Example</title>
601   <script type="text/javascript" src="scripts/wsjsl.js"></script>
602   <script type="text/javascript" src="scripts/com/ibm/icu4js/text/DateFormat_Stub.js"></script>
      <script language="javascript">
603   function formatDate (date, style, srcLocale, destLocale)
      {
604     var df = new DateFormat_Stub()
605     df.format (date, style, strLocale, destLocale, formatCallBack);
      }
606   function formatCallBack(result)
      {
607     document.getElementById('date').innerHTML = result;
      }
      </script>
      </head>
```

Fig. 6

GlIN4JS Sample - DateFormat

Locale: 中文（中国） ▽   Style: Full ▽ month 04 ▽  day 11 ▽ year 2006   [format]

Result:
2006年4月11日星期二

ⓒ 2006G11N4JS IBM
CSDL

GlIN4JS Sample - DateFormat

Locale: English(America) ▽   Style: Full ▽ month 04 ▽  day 11 ▽ year 2006   [format]

Result:
Tuesday, April 11, 2006

ⓒ 2006G11N4JS IBM
CSDL

PROVIDING GLOBALIZATION FUNCTIONALITIES FOR JAVASCRIPT APPLICATIONS

BACKGROUND OF THE INVENTION

The present invention relates in general to JavaScript function implementation. More particularly, the present invention relates to a system and method for providing globalization functionalities for JavaScript applications.

JavaScript language is a scripting language for manipulating HTML documents in browsers. It has been widely adopted in a variety of Web applications to provide more accessible web pages and improve user experience. Ajax (Asynchronous JavaScript And XML) is a technology for developing Web applications that adopts a client side script and a Web server to asynchronously exchange data using the HTTP protocol. Asynchronous invocation is a feature of Ajax. By using this feature, Web applications are capable of dynamically updating contents on a Web page without refreshing the whole page. By using Ajax, a richer and more dynamic Web application user interface can be created. Its low response times and high availability can approach the properties of a local desktop application. At present, Ajax is a part of the JavaScript 1.3 standard and is supported by most mainstream browsers. More and more web applications exploit JavaScript and Ajax to provide comprehensive functionalities, rather than simply detect a browser or validate a certain form on a page.

In developing JavaScript applications with complicated functions, developers usually need to consider various globalization issues, for example, sorting a list of books according to names of the books and the locale without reloading the web page, formatting numbers according to the locale, formatting dates according to preferred local formatting styles, and the like. However, JavaScript provides very limited support for globalization and does not satisfactorily meet various needs presented by real-world scenarios. Therefore, there is a need for a rich set of globalization functions for addressing globalization issues in the JavaScript world, which includes the following functionalities: locale model, culture-sensitive functions, and multilingual support, etc.

Currently, there is no known framework or system that effectively provides a complete set of globalization functionalities for JavaScript applications.

BRIEF SUMMARY OF THE INVENTION

The present invention enables JavaScript applications to access server side globalization components constructed by Web services, through a cross-platform, Ajax-based Web services client. The present invention provides globalization functions through Ajax-based Web services. An embodiment of the present invention may comprise two parts: an Ajax-based Web services client side component and a server side globalization Web services component. The Web services client side component is constructed based on JavaScript and Ajax and enables JavaScript applications to asynchronously invoke Web services. The server side globalization Web services component is capable of providing globalization functionalities to a service requester.

The invention may be embodied as a method for providing globalization functionalities for JavaScript applications. Globalization Web services related to specific JavaScript applications, based on asynchronous JavaScript and XML (Ajax) are invoked. A result of the asynchronous invocation is processed to obtain corresponding globalization functionalities.

The invention may also be embodied as a system for providing globalization functionalities for JavaScript applications. The system has a client side component including a JavaScript application control unit for controlling implementation of client side globalization functionalities. The client side component also includes a Web service execution unit for invoking, under control of the JavaScript application control unit, globalization Web services in a server side related to specific JavaScript applications, based on asynchronous JavaScript and XML (Ajax), and performing processing of a result from said asynchronous invocation as required, thereby obtaining corresponding globalization functionalities. The system further includes a server-side component having a globalization Web service creating unit for creating various globalization Web service components and a Web service control management unit for combining a globalization service function invocation from the client side component with the corresponding globalization Web service components to perform processing, thereby obtaining an invocation result that is returned to the client side component The invention may also be embodied as a computer program product for providing globalization functionality for JavaScript applications. The computer program product includes a computer usable media embodying computer program code. The code includes code to invoke globalization Web services related to specific JavaScript applications based on asynchronous JavaScript and XML (Ajax). The result of the asynchronous invocation is processed to obtain corresponding globalization functionalities.

BRIEF DESCRIPTION OF THE SEVERAL VIEWS OF THE DRAWINGS

FIG. 1 is an overall schematic architecture configuration view of the system for providing globalization functionalities for JavaScript applications according to the present invention.

FIG. 3 is an overall schematic flowchart of the method for providing globalization functionalities for JavaScript applications according to the present invention.

FIG. 5 shows a part of the code of a core method for a typical globalization Web service, i.e., a DateFormat Web service.

FIG. 6 shows an exemplary JavaScript code for invoking a DateFormat Web service.

FIG. 7A and FIG. 7B show a screen display example for an implementation for formatting date according to the locale and formatting styles.

DETAILED DESCRIPTION OF THE INVENTION

Figure 2:
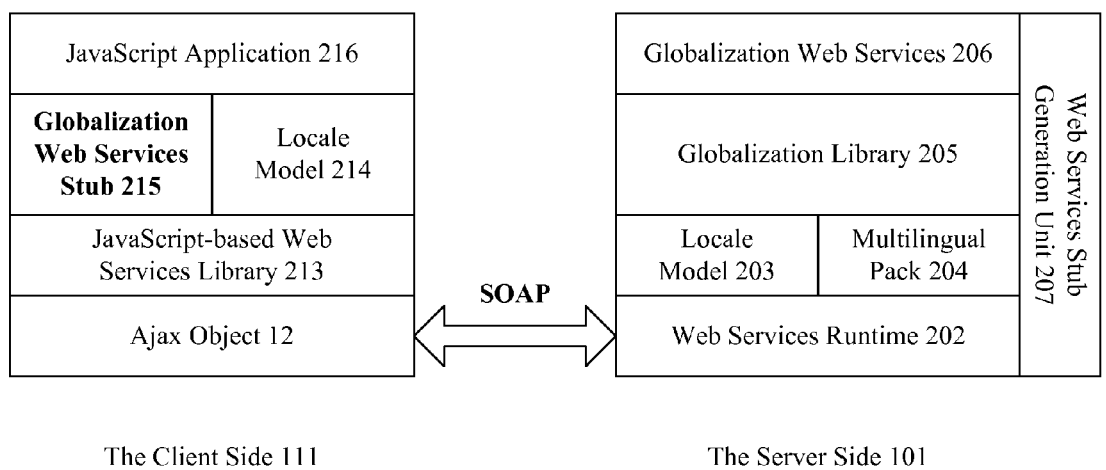
FIG. 2 is a schematic architecture configuration view of an embodiment of the system shown in FIG. 1.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is an overall schematic architecture configuration view of the system for providing globalizations functionalities for JavaScript applications according to the present invention. As shown in FIG. 1, the system according to the present invention comprises a client side component 111 and a server side component 101. The client side component 111 includes a JavaScript application control unit 113 for controlling implementation of globalization functionalities related to a specific JavaScript application performed at the client side component 111, and a Web services execution unit 112 for executing, under the control of the JavaScript application control unit 113, a series of specific operations performed for realizing globalization functionalities, such as transmitting a globalization service request to the server side 101, obtaining a processing result from the server side component 101, and processing the result to cause the client side component 111 to obtain the requested globalization functionality.

The server side component 101 includes a globalization Web services creating unit 103 for creating various globalization service components, and a Web service operation control and management unit 102 for combining the globalization service request from the client side component 111 with various globalization service components for processing so as to obtain a globalization service processing result to be transmitted back to the client side component 111. This will be described in greater detail below with reference to FIG. 2 and FIG. 4.

An architectural configuration of an embodiment of the system shown in FIG. 1 is illustrated in FIG. 2. From a functionality viewpoint, the system of the present invention mainly comprises a plurality of server side functionality modules and a plurality of client side functionality modules. In the system as shown in FIG. 2, the client side component 111 and the server side component 101 interact via a Web service protocol, e.g., SOAP (Simple Object Access Protocol). As shown in FIG. 2, starting from the server side component 101, a Web services runtime 202 is a container of Web services and is responsible for managing a life cycle of a globalization Web service 206.

As an example, IBM WebSphere Application Server can be used as the Web services runtime 202. The Web services runtime 202 corresponds to the Web services execution unit 102 for special use of the server side component 101 in FIG. 1. The globalization Web service 206 is a specialized Web service and conforms to the Web service specification, and provides globalization functionalities for a service requester.

According to different globalization requirements and specific application scenarios, the globalization Web service 206 can be built upon an existing globalization library 205 by using a bottom-up method, or can implement corresponding globalization functionalities by using a top-down method. As examples, the globalization library 205 could be ICU4J (International Component for Unicode for Java), SUN JDK international library, or any other component capable of providing globalization functions. By using the globalization library 205, the globalization Web service 206 can provide support for culture-sensitive functions. Additionally, the globalization Web service 206 further requires support for a locale model and a multilingual pack. The locale model 203 is a specification representing countries, regions and languages. In an embodiment, the server side component 101 is a J2EE server built upon the J2EE technology and is usually developed using Java language. A java.util.Locale object is an example of the locale model.

Certainly, the server side component 101 can also be built upon other technologies that support Web services, such as Microsoft.NET. The localization pack 204 is the multilingual text associated with application and is organized and invoked according to the locale. Thus, the globalization Web service 206 is capable of providing integrated globalization support for JavaScript applications, including locale models, culture-sensitive functions and multilingual support. Locale model 203, localization pack 204, globalization library 205 and globalization Web service 206 correspond to the globalization Web services creating unit 103 of the server side component shown in FIG. 1. The server side component 101 further comprises a Web services stub generation unit 207 which is an independent tool capable of generating JavaScript-based Web service stubs according to a WSDL (Web Services Description Language) file of the globalization Web service 206, so that JavaScript applications can utilize these stubs to invoke the globalization Web service 206. This is explained below in more detail.

Turning back to the client side component 111, the present invention proposes a JavaScript-based Web services library WSJS 213, which is a pure JavaScript library that uses an Ajax object 212 to provide an asynchronous invocation of Web services. Specifically, the Web services library 213 makes a SOAP request according to Web services information with specific parameter values based on specific JavaScript applications, sends the SOAP request, receives a SOAP response by using the Ajax object, and processes the SOAP response to obtain an ultimate invocation result. A globalization Web services stub 215, i.e., the above-mentioned Web service stub, is automatically generated by the above-mentioned Web services stub generation unit 207.

Figure 4:
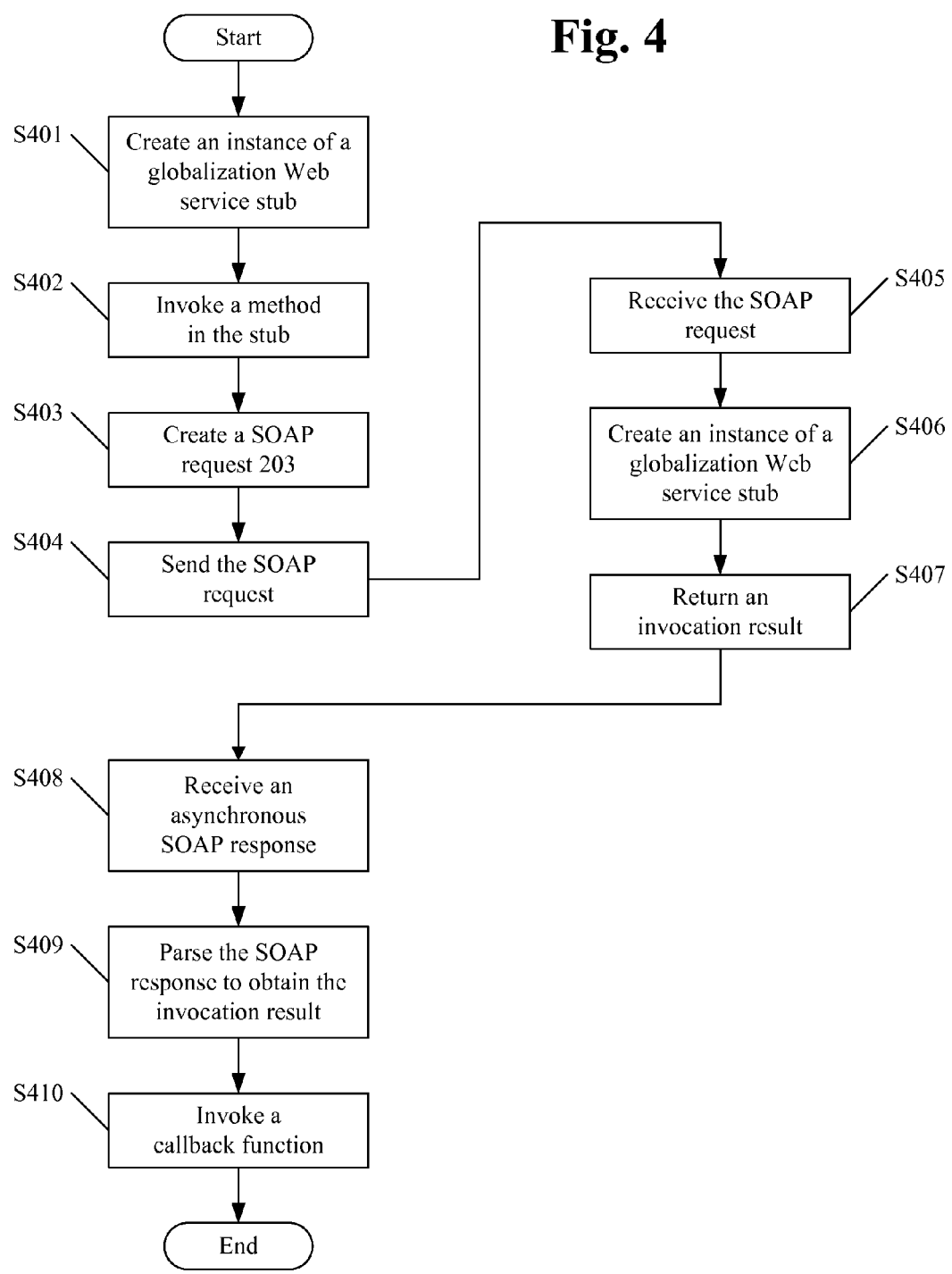
FIG. 4 is a flowchart showing implementation of the method of the present invention by means of the system configuration shown in FIG. 2.

As a specific technique for sending the stub from the server side 101 to the client side 111, the stub, when a user opens a Web page at the client side 111, can be downloaded from the server side 101 by the browser according to code written by developers (see operation 402 in FIG. 4). The stub can simplify a client side programming model, so that JavaScript developers can easily invoke the globalization Web service 206 of the server side component 101 through the stub, without knowing specific technical details of Web services or Ajax.

Alternatively, it is also possible to directly invoke the globalization Web service 206 of the server side 101 by using a programming interface provided by the Web services library 213 rather than using the stub. This technique requires the developers to have a grasp of Web services and Ajax technology. JavaScript also requires support by the locale model 214 and it can be either a JavaScript locale object or a simple character string such as en_US, zh_CN. When the globalization Web service 206 is invoked, the locale usually serves as one of invocation parameters to be passed to the server side 101. The server side component 101 is then responsible for matching the JavaScript locale model 214 with the server side locale model 203, so that it is enabled to be identified and utilized by the globalization Web service 206. The Ajax object 212, Web services library 213 and globalization Web services stub 215 correspond to the Web services execution unit 112 in the client side component 111 shown in FIG. 1.

A JavaScript application 216 is a specific application developed by JavaScript developers. The application, according to different requirements, invokes the corresponding globalization Web service 206 by using the globalization Web services stub 215, and the invocation result may be displayed on a current Web page or subjected to other processing. The JavaScript application 216 and locale model 214 correspond to the JavaScript application control unit 113 of the client side component 111 shown in FIG. 1.

FIG. 3 is a flowchart of a method for providing globalization functionalities for JavaScript applications according to the present invention. As shown in FIG. 3, a method according to the present invention comprises the steps of determining invocation conditions according to a specific JavaScript application at the client side component 111, and asynchronously invoking the corresponding globalization Web services of the server side component 101 through Ajax based on the determined conditions (step S301). Then, an invocation result is processed at the client side component 111 as required (step S302).

FIG. 4 is a flowchart showing an implementation of the method of the present invention. As shown in FIG. 4, when the JavaScript application 216 of the client side component 111 requires invocation of a certain globalization Web service, the application first creates an instance of a globalization Web service stub (see code line 604 in FIG. 6) (step S401) and then invokes a corresponding method in the stub (step S402), and passes corresponding parameters (including the locale related to globalization functions) and a callback function (see code line 605 in FIG. 6). Subsequently, the invoked method in the stub invokes the JavaScript-based Web services library 213. The latter is responsible for creating a corresponding SOAP request, including name, method, parameter value, address and other information of the Web service to be invoked (step S403).

In step S404, the JavaScript-based Web services library 213 invokes a network access object (XMLHTTPRequest) in the Ajax object 212 and asynchronously sends the SOAP request (step S404). When the server side component 101 receives the SOAP request (step S405), the Web services runtime 202 searches for and invokes the corresponding globalization Web service 206 according to the received SOAP request (step S406) and returns the invocation result (step S407). After the client side component 111 has asynchronously sent the SOAP request, the browser is always in a monitoring state. When the invocation result is returned as a SOAP response, the browser receives a message (step S408). Then, the browser invokes the JavaScript-based Web services library 213. The Web services library 213 parses the SOAP response and obtains the invocation result (step S409). Finally, in step S410, the Web services library 213 invokes the callback function specified in step S402 and passes the invocation result to the function. The callback function can perform different processes of the invocation result according to actual needs, for example, displaying the invocation result on a certain position of a page.

FIG. 5 depicts a part of the code that can be used for DateFormat Web service (one of the globalization Web services), which is a Web service developed using the Java language. As described above, if the server side component 101 is a server based on Microsoft.NET technology, then the Web service can also be developed by using .NET technology. As shown in FIG. 5, code line 501 is a method provided by the DateFormat Web service. This method parses a date value according to input locale information, then formats it into a date string for a specified locale, and returns a result of the string type. As an example, this method first invokes DateFormat class of ICU4J and creates an instance according to a locale value (code line 502). Then, the instance of DateFormat invokes a parse method (code line 503) and parses the passed date string into a Java Date object. Code line 504 re-constructs an instance of DateFormat, and unlike line 502, code line 504 specifies a different locale value during construction of the instance, this locale value being a locale to which the finally returned formatted date string corresponds. Finally, code line 505 formats the date object and returns the result as a string. The method represented by the code in FIG. 5 is implemented at the server side component 101, namely, one corresponding to steps S405-S407 in FIG. 4.

Referring to FIG. 6, the figure depicts exemplary JavaScript code for invoking the DateFormat Web service. In order to invoke the globalization Web service, the JavaScript-based Web services library 213 (see FIG. 2) is included. In the embodiment, this library is named as wsjsl.js (code line 601). Code line 602 references a stub, DateFormat_Stub.js, for the DateFormat Web service created by the Web services stub generation unit 207. Code line 603 invokes the DateFormat Web service and input parameters of the method, including a date string required to be formatted, formatting style (long, intermediate or short), a locale value of the date string required to be formatted, and a locale value to which the finally formatted data string corresponds. Code line 604 creates an instance of the stub and then invokes a format method of the stub. Code line 605, in addition to the above-mentioned four parameters, has a parameter called "formatCallBack", a name of a callback function. This function (code line 606) is invoked by the JavaScript-based Web services library 213 when the result of asynchronous invocation is returned. This method has an input parameter which is a returned result of invoking the DateFormat Web service. Eventually, code line 607 displays the invocation result on a current Web page. The whole invocation process is asynchronous, so the Web page will not be refreshed. The method represented by the codes in FIG. 6 is implemented at the client side component 111, namely, corresponding to steps S401-S404 and S408-S410 in FIG. 4. When a user of the client side component 111 opens a page, the corresponding JavaScript code will be downloaded to a client browser and executed at the client side component 111.

FIG. 7A and FIG. 7B show a screen display example of the DateFormat Web service for implementation of formatting dates according to the locale and formatting styles. FIG. 7A is a formatting result obtained when the selected locale is English (USA), while FIG. 7B is a formatting result obtained when the selected locale is Chinese (China).

Figure 8B:
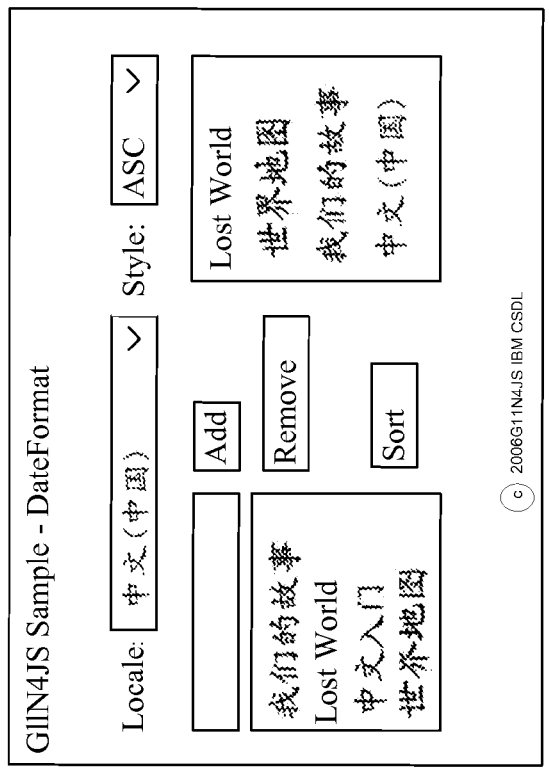
FIG. 8A and FIG. 8B show a screen display example for an implementation for sorting a list of books according to names and the locale.
Figure 8A:
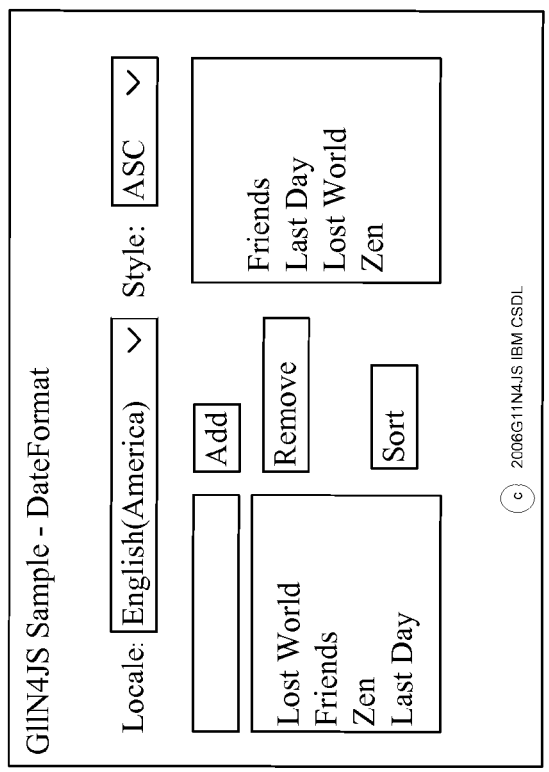

FIG. 8A and FIG. 8B show an example of a screen display for an implementation of sorting a list of books according to names and the locale. Sorting is another type of typical globalization Web service, and according to a specified locale and a sorting order, the input character strings can be arranged in accordance with sorting rules. FIG. 8A is a sorting result when the selected locale is English (USA), while FIG. 8B is a sorting result obtained when the selected locale is Chinese (China).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for globalizing functions included in a JavaScript application running in a client device, the method being performed in the client device and comprising:
   asynchronously invoking globalization Web services available in a server device, said Web services being related to functions in said JavaScript application, said invoking being based on asynchronous JavaScript contained within said functions;
   receiving a response to the asynchronous invocation from the server device; and
   processing said received response to globalize a function included in the JavaScript application running in the client device,
   wherein asynchronously invoking the globalization Web services available in a server device further comprises:
      creating a Simple Object Access Protocol (SOAP) request;
      invoking the globalization Web services through the SOAP request; and
      receiving the invocation result as a SOAP response, and wherein processing a result of the asynchronous invocation further comprises:
  parsing the SOAP response to obtain the invocation result; and
  processing the parsed invocation result to obtain the required globalization functionalities.

2. The computer-implemented method according to claim 1, wherein said step of creating a SOAP request further comprises:
  creating an instance of a stub of the corresponding globalization Web service;
  invoking a corresponding method in the stub and passing corresponding parameters and callback function, the invoked method in the stub invoking a JavaScript-based Web services library.

3. The computer-implemented method according to claim 2, wherein the parameters passed during invoking the corresponding method in the stub comprise a locale identifier related to the corresponding globalization functionalities, and wherein said created SOAP request comprises information concerning name, method, parameter values and address of the Web services to be invoked.

4. The computer-implemented method according to claim 2, wherein processing the parsed invocation result to obtain the required globalization functionalities further comprises:
  invoking said callback function, and
  passing said parsed invocation result to the callback function, the callback function performing different processes of the parsed invocation result according to actual needs.

5. The computer-implemented method according to claim 4 wherein globalization functionalities obtained by processing said parsed invocation result comprise one or more of locale-specific text, locale-specific representation of dates and locale-specific formatting of numbers.

6. A computer-implemented system for globalizing functions included in a JavaScript application running in a client device including a processor, said system, comprising:
  a client side component in said client device including:
    a JavaScript application control unit for controlling implementation of client side functions; and
    a Web service execution unit for invoking, under control of the JavaScript application control unit, globalization Web services in a server side component related to specific JavaScript applications, based on asynchronous JavaScript and XML (Ajax), and performing processing of a received invocation result of said asynchronous invocation to obtain corresponding globalization functionalities; and
  a server side component comprising:
    a globalization Web service creating unit for creating various globalization Web service components; and
    a Web service control management unit for combining a globalization service function invocation from the client side component with the corresponding globalization Web service components to perform processing, thereby obtaining an invocation result, and returning the invocation result to the client side component,
  wherein said Web services execution unit further comprises a JavaScript-based Web services library for providing asynchronous invocation of Web services based on Ajax, and
  wherein said Web services library is configured to:
    create a Simple Object Access Protocol (SOAP) request according to Web services information and specific parameter values based on specific JavaScript applications;
    send the SOAP request and receive a SOAP response by using the Ajax object; and
    process the SOAP response to obtain an ultimate invocation result.

7. The computer-implemented system according to claim 6, wherein said Web services execution unit further comprises:
  a component for receiving a globalization Web service from the server side component, said Web services execution unit realizing the Ajax invocation of globalization Web services in the server side component by using the globalization Web services stub.

8. The computer-implemented system according to claim 6, wherein said JavaScript application control unit further comprises:
  a JavaScript application that invokes corresponding globalization Web services in the server side component according to different requirements; and
  a JavaScript locale model that is passed to the server side component as one of invocation parameters through said SOAP request and is matched with a server side locale model, enabling it to be identified and utilized by said Web services control management unit.

9. The computer-implemented system according to claim 6, wherein the globalization Web services creating unit further comprises:
  a globalization Web service for providing globalization functionalities to a service requester;
  a globalization library capable of providing globalization functionalities, said globalization Web service providing support for culture-sensitive functions in the globalized functionalities by using the globalization library;
  a server side locale model representing countries/regions and languages, for matching said locale model when processing the globalization functionality invocation from the client side component; and a localization pack having multilingual text related to applications and organized and invoked according to the locale.

10. A computer program product for providing globalization functionalities for JavaScript applications, the computer program product comprising a non-transitory computer usable medium storing computer usable program code, the computer usable program code comprising:
  computer usable program code configured to asynchronously invoke globalization Web services related to specific JavaScript applications, based on asynchronous JavaScript and XML (Ajax); and
  computer usable program code configured to process a result of the asynchronous invocation to obtain corresponding globalization functionalities,
  wherein the computer usable program code configured to asynchronously invoke the globalization Web services related to specific JavaScript applications, based on asynchronous JavaScript and XML (Ajax), further comprises:
    computer usable program code configured to create a Simple Object Access Protocol (SOAP) request;
    computer usable program code configured to invoke the globalization Web services based on Ajax through the SOAP request; and
    computer usable program code configured to receive the invocation result as a SOAP response, and
  wherein the computer usable program code configured to process a result of the asynchronous invocation to obtain corresponding globalization functionalities further comprises:

computer usable program code configured to parse the SOAP response to obtain the invocation result; and computer usable program code configured to process the parsed invocation result to obtain the required globalization functionalities.

11. The computer program product according to claim 10 wherein the computer usable program code configured to create a SOAP request further comprises:

computer usable program code configured to create an instance of a stub of the corresponding globalization Web service; and computer usable program code configured to invoke a corresponding method in the stub and pass corresponding parameters and callback function, the invoked method in the stub invoking a JavaScript-based Web services library.

12. The computer program product according to claim 11 wherein the passed parameters comprise a locale identifier related to the corresponding globalization functionalities, and wherein said created SOAP request comprises information concerning name, method, parameter values and address of the Web services to be invoked.

13. The computer program product according to claim 11 wherein the computer usable program code configured to process the parsed invocation result to obtain the required globalization functionalities further comprises:

computer usable program code configured to invoke the callback function, and computer usable program code configured to pass said parsed invocation result to the callback function, the callback function performing different processes of the parsed invocation result according to actual needs.

14. The computer program product according to claim 13 wherein globalization functionalities obtained by processing the parsed invocation result comprise one or more of locale-specific text, locale-specific representation of dates and locale-specific formatting of numbers.

\* \* \* \* \*